A. L. OTTENAD.
COLLAPSIBLE TIRE RIM.
APPLICATION FILED OCT. 26, 1914.
1,163,257. Patented Dec. 7, 1915.
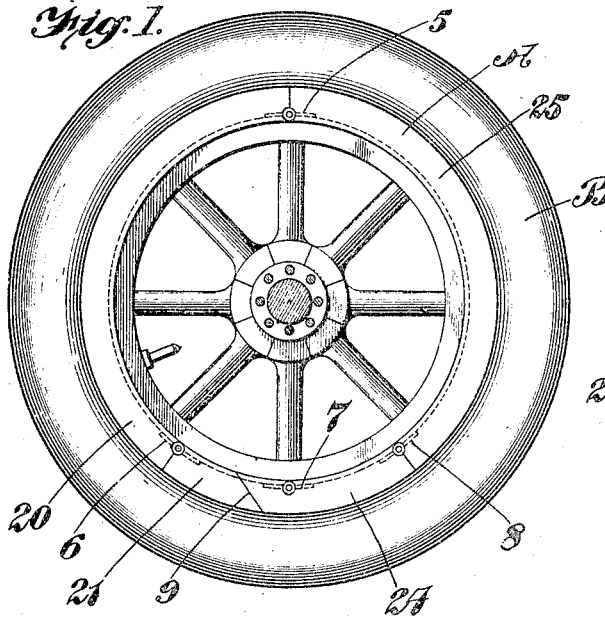
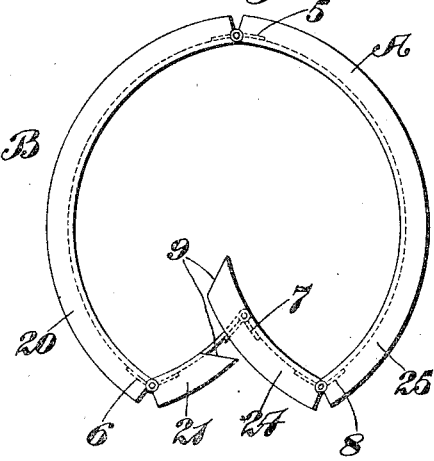
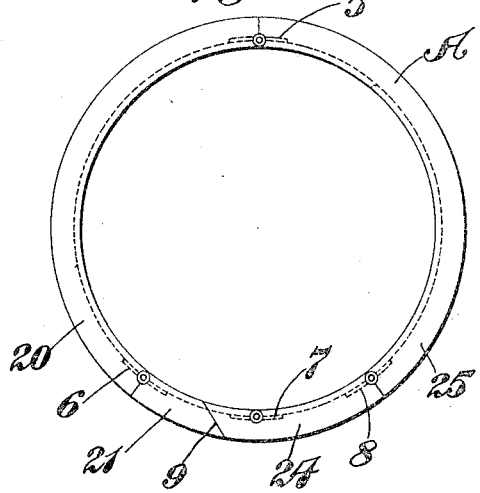
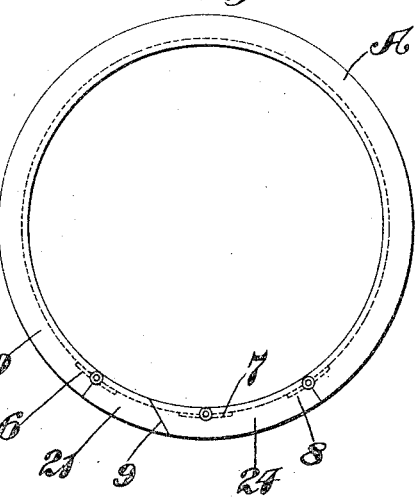
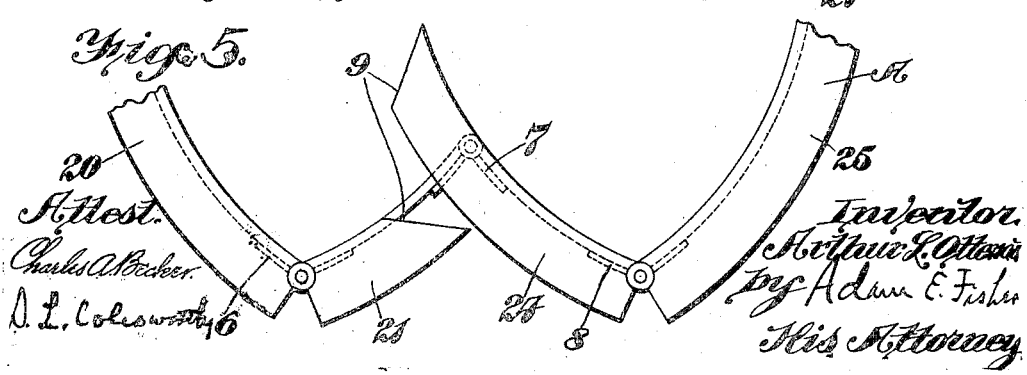

UNITED STATES PATENT OFFICE.

ARTHUR L. OTTENAD, OF ST. LOUIS, MISSOURI.

COLLAPSIBLE TIRE-RIM.

1,163,257.

Specification of Letters Patent.

Patented Dec. 7, 1915.

Application filed October 26, 1914. Serial No. 868,588.

*To all whom it may concern:*

Be it known that I, ARTHUR L. OTTENAD, a citizen of the United States, residing in the city of St. Louis, Missouri, have invented new and useful Improvements in Collapsible Tire-Rims, of which the following is a specification, reference being had to the accompanying drawings.

My invention relates to that class of tire rims or tire supports commonly known as demountable rims, and which are employed as supports for inflated automobile pneumatic tires or for similar bicycle or motorcycle tires.

The purpose of this class of demountable rims is to provide convenient means whereby such pneumatic or similar tires may be carried, ready inflated, suspended from the sides or back of the machine, as extra or emergency tires, and may be readily and easily placed upon the wheel proper to replace a deflated, punctured or otherwise injured tire. But it is well known that in order to remove one of such tires from the rim ordinarily employed, requires considerable time and labor, as the tire has to be pried loose from its bed within the concave rim.

The main purpose of my invention, therefore, is to produce a collapsible tire rim or support of the demountable type, so constructed that whenever it becomes necessary for any purpose to remove the tire from the supporting rim, or to replace said tire thereon, this may be accomplished most easily, conveniently and expeditiously, by merely collapsing the tire rim proper, so that the tire itself may be readily taken off or placed back upon the rim.

Another object of my invention is to produce such a tire rim in its cheapest, simplest and most practical and efficient form.

In a known form of construction of a collapsible rim, the rim is at one point entirely divided, so that the free ends thereof hang entirely independent of one another when the rim is in a collapsed condition, and the ends merely abut against one another when the tire is inflated and the supporting rim is extended accordingly. In this form of construction therefore, the rim is greatly weakened at this point of division, and which difficulty is entirely obviated in my form of construction. In another known form of construction, one at least of the hinges joining the sections is a double hinge, and is placed so far back along the main rim section, as to likewise weaken the rim as a whole at the points where the severed ends meet. In this form of construction also, the degree of collapse permitted the rim as a whole is quite limited.

With the objects therefore of producing a tire rim of the demountable type, having the maximum of advantage and the minimum of disadvantage of this type, attention is called to the following specification, illustrated by the accompanying drawings, in which—

Figures I, II, III, IV, and V show in detail the construction of my tire-rim, the method of hinging the sections together and the preferential form of central hinge and its construction and operation.

Referring more particularly to the drawings, my collapsible rim is made up of four sections hinged rigidly together at their ends by the hinges 5, 6, 7, and 8 in such manner as to permit the two shorter sections 21 and 24 (of the revised numbering).

In the special form of central hinge shown in Figs. I, II, III, IV, and V, it will be seen that the sides of the tire rim as represented at 20, 21, 24 and 25, meet together at an angle, when the hinge is closed, and that the knuckle 23 of this hinge does not coincide with the point of juncture of said sides of the tire rim, but is located along the bottom of the tire rim at a point approximately from one-half inch to an inch distant from said point of juncture of the sides of the tire rim. The merit of this form of structure of such hinge is that the hinge will open perfectly, in this form, and will likewise close and form a perfectly smooth and continuous tire-rim surface with no breaks or gaps whatever.

The whole rim, its elements and accessories, as herein described, are of course to be constructed of such materials, and in such proportions and dimensions of inter-relation, as when assembled will form a complete and perfectly working whole, the best calculated to carry out the purposes of my invention.

In actual use it will be seen that pneumatic and like tires may be readily mounted upon rims of my collapsible construction, or as readily detached therefrom, by merely buckling the hinged sections of the rim inwardly. When the tire is mounted, the auxiliary hinged segment is then pressed down and locked, in manner shown, in order to render the whole firm and secure. In other respects my rims are to be constructed in the customary manner, form and design and are to be mounted upon the wheel base proper by means of the clamps commonly employed. It will be seen that my invention greatly expedites the work of replacing tires upon the rims.

Although I have herein described and set forth certain specific manner and methods of construction of my said improvements, I reserve the right to modify the same in minor details, not departing from the spirit of my invention, so as best to construct my improvement to meet practical demands.

Having thus described my invention, what I claim to be new and patentable is:

A collapsible tire rim made up of a plurality of rim segments hinged together in circuit from their extremities so that at least two of said segments will buckle inwardly, the hinge of the inwardly buckling joint being recessed back from one end of the joint and forward from the other end of the joint; said ends of said joint being obliquely cut away, so as to allow said joint to open freely and to close forming a continuous rim surface, as shown.

ARTHUR L. OTTENAD.

Witnesses:
S. COLESWORTHY,
W. S. BURNS, Jr.